United States Patent
Yamada et al.

(10) Patent No.: US 10,042,386 B2
(45) Date of Patent: Aug. 7, 2018

(54) INFORMATION PROCESSING APPARATUS, INFORMATION PROCESSING METHOD, AND PROGRAM

(75) Inventors: Eiju Yamada, Kanagawa (JP); Yoshinori Ohashi, Tokyo (JP); Akihiko Kinoshita, Tokyo (JP)

(73) Assignee: Saturn Licensing LLC, New York, NY (US)

( * ) Notice: Subject to any disclaimer, the term of this patent is extended or adjusted under 35 U.S.C. 154(b) by 0 days.

(21) Appl. No.: 13/497,984

(22) PCT Filed: Aug. 31, 2010

(86) PCT No.: PCT/JP2010/064770
§ 371 (c)(1),
(2), (4) Date: Mar. 23, 2012

(87) PCT Pub. No.: WO2011/040165
PCT Pub. Date: Apr. 7, 2011

(65) Prior Publication Data
US 2012/0176336 A1  Jul. 12, 2012

(30) Foreign Application Priority Data
Oct. 1, 2009  (JP) .................................. 2009-229481

(51) Int. Cl.
*G06F 1/16* (2006.01)
*G06F 3/0488* (2013.01)
(Continued)

(52) U.S. Cl.
CPC ........ *G06F 1/1626* (2013.01); *G06F 3/04883* (2013.01); *G06F 3/04886* (2013.01);
(Continued)

(58) Field of Classification Search
CPC .................................................. G06F 1/1626
See application file for complete search history.

(56) References Cited

U.S. PATENT DOCUMENTS 5,907,327 A * 5/1999 Ogura ................... G06F 3/0486
                                                    345/173
6,714,221 B1 * 3/2004 Christie ................ G06F 3/0485
                                                    715/784
(Continued)

FOREIGN PATENT DOCUMENTS

EP    1 892 611 A1    2/2008
JP    2009-110286 A   5/2009
(Continued)

OTHER PUBLICATIONS

International Search Report, PCT/US2010/064770, dated Dec. 7, 2010.
(Continued)

*Primary Examiner* — Sejoon Ahn
(74) *Attorney, Agent, or Firm* — Oblon, McClelland, Maier & Neustadt, L.L.P.

(57) ABSTRACT

[Object] To provide an information processing apparatus, an information processing method, and a program for enabling a user to easily and accurately determine an operation state of the apparatus.
[Solution] An information processing apparatus includes a display panel 101a, a touch panel 101b for detecting a finger moving on the display panel, and a control unit 103 for designating a predetermined moving direction Dd and determining an operation state of the apparatus based on a difference between the designated moving direction Dd and a moving direction Da of the finger moving on the display panel according to the designation. When the apparatus is operated with either hand, a difference due to a finger used for the operation easily occurs between the designated moving direction and the moving direction of the finger due to a structure of the hand. When the apparatus is operated with both hands, a difference due to fingers used for the operation hardly occurs between the designated moving (Continued)

direction and the moving direction of the finger. An operation state of the apparatus can be determined based on the difference between the moving directions.

9 Claims, 10 Drawing Sheets (51) Int. Cl.
    *H04N 21/422*     (2011.01)
    *H04N 21/482*     (2011.01)
    *H04N 21/485*     (2011.01)

(52) U.S. Cl.
    CPC ..... *H04N 21/42224* (2013.01); *H04N 21/482* (2013.01); *H04N 21/4852* (2013.01); *H04N 21/4854* (2013.01)

(56) References Cited

U.S. PATENT DOCUMENTS

| | | | | |
|---|---|---|---|---|
| 7,480,870 | B2* | 1/2009 | Anzures | G06F 3/017 345/173 |
| 7,903,115 | B2* | 3/2011 | Platzer et al. | 345/473 |
| 7,932,895 | B2* | 4/2011 | Rainisto | 345/173 |
| 8,103,263 | B2* | 1/2012 | Shim et al. | 455/418 |
| 8,493,338 | B2* | 7/2013 | Nakajoh | 345/173 |
| 8,531,515 | B2* | 9/2013 | Watanabe et al. | 348/81 |
| 8,619,034 | B2* | 12/2013 | Grad | G06F 3/0416 345/168 |
| 8,643,713 | B2* | 2/2014 | Watanabe et al. | 348/81 |
| 8,698,764 | B1* | 4/2014 | Karakotsios et al. | 345/173 |
| 8,863,042 | B2* | 10/2014 | Kulas | 715/864 |
| 8,893,052 | B2* | 11/2014 | Ryu | 715/863 |
| 9,152,309 | B1* | 10/2015 | Arrehn | G06F 3/04845 |
| 2006/0116203 | A1* | 6/2006 | Nakada et al. | 463/30 |
| 2007/0277124 | A1* | 11/2007 | Shin | G06F 3/04883 715/863 |
| 2008/0055263 | A1* | 3/2008 | Lemay | H04M 1/72522 345/173 |
| 2008/0082934 | A1* | 4/2008 | Kocienda | G06F 3/04886 715/773 |
| 2008/0165161 | A1* | 7/2008 | Platzer | G06F 1/1616 345/177 |
| 2009/0109183 | A1* | 4/2009 | Carvajal et al. | 345/173 |
| 2009/0109187 | A1* | 4/2009 | Noma | 345/173 |
| 2009/0160792 | A1* | 6/2009 | Morohoshi et al. | 345/173 |
| 2009/0167696 | A1* | 7/2009 | Griffin | 345/169 |
| 2009/0241072 | A1* | 9/2009 | Chaudhri et al. | 715/863 |
| 2009/0267907 | A1* | 10/2009 | Noma | 345/173 |
| 2009/0295743 | A1* | 12/2009 | Nakajoh | 345/173 |
| 2010/0013780 | A1* | 1/2010 | Ikeda et al. | 345/173 |
| 2010/0085317 | A1* | 4/2010 | Park et al. | 345/173 |
| 2011/0050591 | A1* | 3/2011 | Kim | G06F 3/0488 345/173 |
| 2011/0161888 | A1* | 6/2011 | Ito et al. | 715/856 |
| 2011/0231796 | A1* | 9/2011 | Vigil | 715/810 |
| 2011/0260962 | A1* | 10/2011 | Benko | G06F 3/04883 345/156 |
| 2012/0293456 | A1* | 11/2012 | Ikeda | G06F 1/1626 345/174 |
| 2013/0002578 | A1* | 1/2013 | Ito et al. | 345/173 |
| 2013/0067366 | A1* | 3/2013 | Almosnino | G06F 3/0483 715/764 |
| 2013/0141373 | A1* | 6/2013 | Takuma et al. | 345/173 |
| 2013/0194186 | A1* | 8/2013 | Choi et al. | 345/163 |
| 2014/0106816 | A1* | 4/2014 | Shimuta | 455/556.1 |
| 2014/0137049 | A1* | 5/2014 | Jung et al. | 715/847 |

FOREIGN PATENT DOCUMENTS

| | | |
|---|---|---|
| JP | 2009-163278 A | 7/2009 |
| RU | 63 947 U1 | 6/2007 |
| RU | 2 347 261 C2 | 2/2009 |

OTHER PUBLICATIONS

European Office Action dated Apr. 18, 2017 in Patent Application No. 10 820 285.4.

\* cited by examiner

INFORMATION PROCESSING APPARATUS, INFORMATION PROCESSING METHOD, AND PROGRAM

CROSS-REFERENCES TO RELATED APPLICATIONS

The present application is a national phase entry under 35 U.S.C. § 371 of International Application No. PCT/JP2010/064770 filed Aug. 31, 2010, published on Apr. 7, 2011 as WO 2011/140165 A1, which claims priority from Japanese Patent Application No. JP 2009-229481 filed in the Japanese Patent Office on Oct. 1, 2009.

TECHNICAL FIELD

The present invention relates to an information processing apparatus, an information processing method, and a program.

BACKGROUND ART

In recent years, there have been widely used portable information processing apparatuses provided with a touch panel display. A user inputs predetermined operations via a graphical user interface (GUI) displayed on the touch panel display.

The user inputs operations on the touch panel with the dominant hand while holding an apparatus with the dominant hand or with the dominant hand while holding the apparatus with the nondominant hand. Operability of the touch panel may be different due to the GUI configuration depending on an operation state, for example, an operation is easy with one hand but is difficult with the other hand or an operation is easy with both hands but is difficult with either hand. Thus, the operability of the information processing apparatus may be deteriorated.

SUMMARY OF INVENTION

Technical Problem

On the other hand, in a conventional information processing apparatus, operation states may be previously set and a GUI configuration may be changed depending on the setting. However, the operation state is different per user and is different even for the same user when one-hand operation and both-hand operation are used together. Thus, the setting has to be changed whenever the operation state is changed, which imposes a complicated setting operation on the user.

In view of the foregoing, it is desirable to provide an information processing apparatus, an information processing method, and a program for enabling a user to easily and accurately determine an operation state of the apparatus.

Solution to Problem

According to a first embodiment of the present invention, there is provided an information processing apparatus including a display panel, a detection unit for detecting a finger moving on the display panel, and a determination unit for designating a predetermined moving direction and determining an operation state of the apparatus based on a difference between the designated moving direction and a moving direction of the finger moving on the display panel according to the designation.

With the structure, the operation state of the apparatus can be determined based on the difference between the designated moving direction and the moving direction of the finger moving on the display panel according to the designation. When the apparatus is operated with one hand, a difference due to the hand structure and depending on the finger used for the operation easily occurs between the designated moving direction and the finger's moving direction. On the other hand, when the apparatus is operated with both hands, a difference depending on the fingers used for the operation is less likely to occur between the designated moving direction and the finger's moving direction. Therefore, the operation state of the apparatus can be easily and accurately determined based on the difference between the moving directions.

The determination unit may designate multiple mutually-different moving directions and determine the operation state of the apparatus based on a difference between each of the designated moving directions and each moving direction of the finger moving on the display panel according to the designation. The determination unit may designate multiple mutually-orthogonal moving directions.

The information processing apparatus may further include a display control unit for controlling the display of the display panel according to the determination result of the operation state.

The determination unit may determine an operation state in which one hand holds and operates the apparatus and an operation state in which one hand holds the apparatus and the other hand operates the apparatus. The determination unit may determine an operation state in which the left hand holds and operates the apparatus and an operation state in which the right hand holds and operates the apparatus.

The determination unit may find a moving direction of a finger based on a coordinate difference between a moving start point and a moving end point of the finger moving on the display panel according to the designation.

The predetermined moving direction may be designated as any of the upper direction, the lower direction, the left direction and the right direction on the display panel.

The determination unit may designate the moving direction on the display panel and find a moving direction of a finger based on a moving trajectory of the finger continuously detected on the display panel according to the designation. The determination unit may designate two or more points by which the moving direction on the display panel can be specified, and find a moving direction of the finger based on the moving coordinate of the finger discretely detected between one point and the other point on the display panel according to the designation.

The information processing apparatus is a portable information processing apparatus such as a personal digital assistant (PDA) or a cell phone, and may be a remote controller for operating an electronic device.

According to a second embodiment of the present invention, there is provided an information processing method for, by the information processing apparatus, designating a predetermined moving direction, and determining an operation state of the apparatus based on the designated moving direction and a moving direction of a finger moving on a display panel according to the designation.

According to a third embodiment of the present invention, there is provided a program for causing a computer to execute the information processing method. The program may be provided by use of a computer-readable recording medium or may be provided via a communication means.

Advantageous Effects of Invention

According to the present invention, it is possible to provide an information processing apparatus, an information processing method, and a program for enabling a user to easily and accurately determine an operation state of the apparatus.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

A remote controller 100 according to one embodiment of the present invention will be described below. The present invention is not limited to the remote controller 100, and is similarly applicable to portable information processing apparatuses such as a personal digital assistant (PDA) and a cell phone provided with a touch panel display 101.

1. Structure of Remote Controller System

Figure 1:
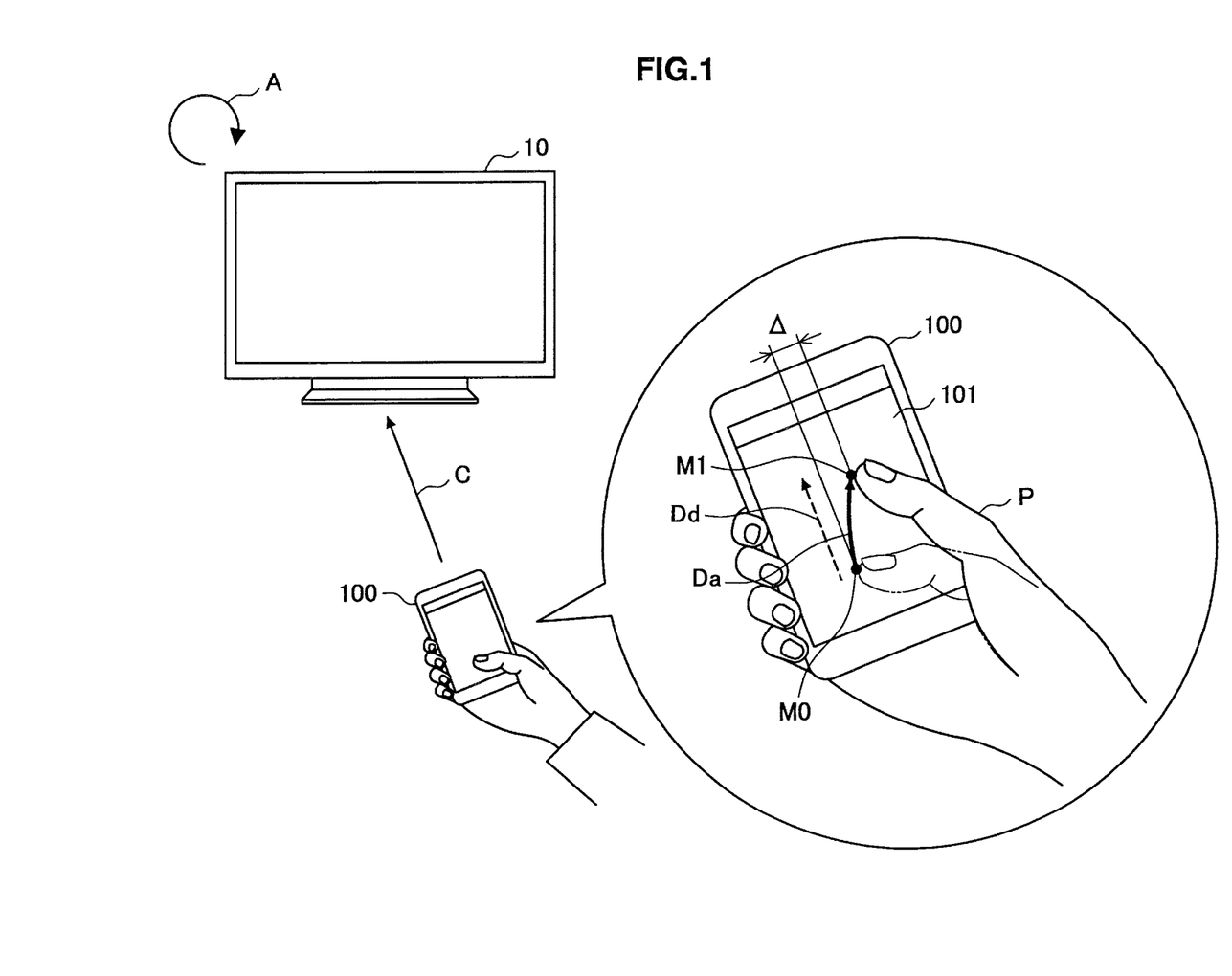
FIG. 1 is a diagram showing a remote controller system including a remote controller according to one embodiment of the present invention.

FIG. 1 is a diagram showing a remote controller system including the remote controller 100 according to one embodiment of the present invention. As shown in FIG. 1, the remote controller system includes the remote controller 100 provided with the touch panel display 101, and a television 10 operated via the remote controller 100. The television 10 is an exemplary electronic device operated via the remote controller 100.

In the remote controller system, wired communication or wireless communication is made at least from the remote controller 100 toward the television 10. The communication between the remote controller 100 and the television 10 may be made directly or may be made indirectly via a network or the like (not shown).

The remote controller 100 displays operation icons for operating the television 10 on the touch panel display 101. When an operation such as selection of an icon is input, the remote controller 100 transmits a predetermined operation command C to the television 10 in response to the operation input. The television 10 receives the operation command C and performs a predetermined operation A in response to the operation command C.

The user typically holds the remote controller 100 with the dominant hand and operates the touch panel display 101 with the dominant hand, or holds the remote controller 100 with the nondominant hand and operates the touch panel display 101 with the dominant hand. The remote controller 100 determines an operation state of the remote controller 100 at a predetermined point of time, and changes the display of GUI such as operation icons.

Upon the determination of the operation state, the remote controller 100 designates a predetermined moving direction Dd, and detects a moving direction Da of a finger P moving on the touch panel display 101 according to the designation. Then, the remote controller 100 determines an operation state of the apparatus based on a difference Δ between the designated moving direction Dd and the detected moving direction Da.

An explanation will be made assuming that the remote controller 100 is held with the right hand and the touch panel display 101 is operated with the thumb P of the right hand. In this case, even when the user tries to move the thumb P just in the upper direction Dd on the touch panel display 101 (in parallel to the panel surface), the moving direction Da of the thumb tilts in the upper right direction due to the structure of the right hand. Thus, the moving direction Da of the finger P moving according to the designation is detected, and thereby the operation state of the remote controller 100 can be determined based on the difference Δ between the designated moving direction Dd and the detected moving direction Da.

2. Structure of Remote Controller 100

Figure 2:
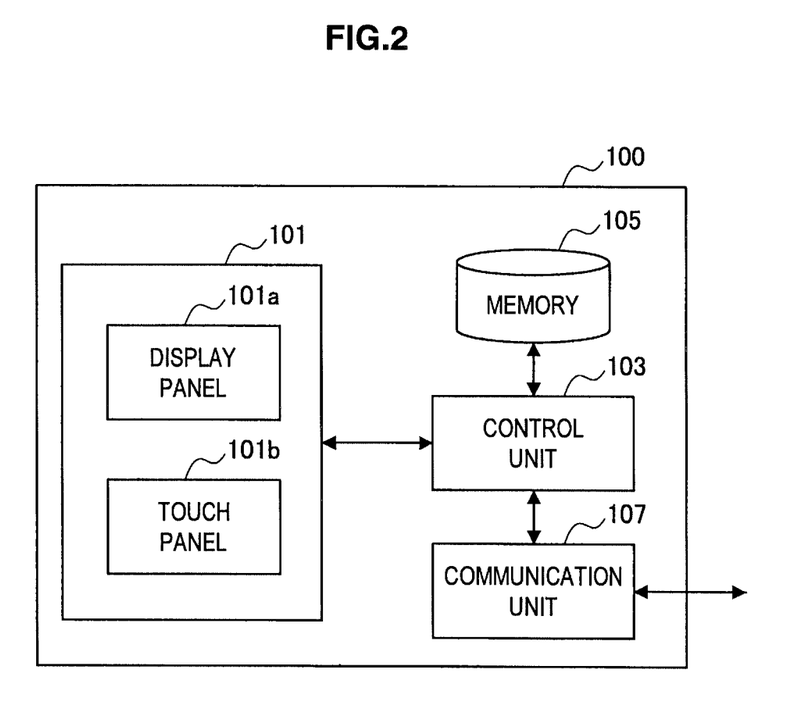
FIG. 2 is a block diagram showing a structure of main functions of the remote controller according to one embodiment of the present invention.

FIG. 2 is a block diagram showing a structure of main functions of the remote controller 100 according to the embodiment of the present invention. As shown in FIG. 2, the remote controller 100 includes the touch panel display 101, a control unit 103, a memory 105 and a communication unit 107.

The touch panel display 101 is configured such that a touch panel 101b (detection unit) is laminated on a display panel 101a. The display panel 101a employs a liquid crystal display (LCD) or the like. The touch panel 101b employs a panel of resistive system, electrostatic capacity system, ultrasonic system, infrared ray system or the like.

The touch panel 101b detects a contact state of the finger P on the panel surface. In other embodiments, an approaching state of the finger P may be detected instead of or in addition to the contact state. The touch panel 101b supplies a contact signal to the control unit 103 when the finger P comes in contact with the touch panel 101b, and supplies a release signal to the control unit 103 when the finger P separates from the touch panel 101b.

The touch panel 101b supplies a coordinate signal corresponding to the contact position to the control unit 103 while the finger P is in contact with the touch panel 101b. The coordinate signal indicates X-Y coordinates of the contact position on the touch panel 101b. In the following explanation, the horizontal direction of the touch panel 101b is defined as the X direction (the left direction with − and the right direction with +), and the longitudinal direction is defined as the Y direction (the upper direction with + and the lower direction with −).

The control unit 103 includes a CPU, a RAM, a ROM and the like, and the CPU uses the RAM as a work memory to execute programs stored in the ROM and to control the respective units in the remote controller 100. The programs function as the determination unit for determining the operation state of the remote controller 100 and the display control unit for controlling the display of the display panel 101a.

The memory 105 is a nonvolatile memory such as an EEPROM, and stores icon data, command information and the like therein. The communication unit 107 transmits the predetermined operation command C to the television 10 in response to a user's operation input.

The control unit 103 decodes the coordinate signal supplied from the touch panel 101b to generate coordinate data, and controls each unit of the remote controller 100 based on the coordinate data and the contact/release signal. The control unit 103 reads the command information depending on the operation input from the memory 105 and supplies it to the communication unit 107 in response to a user's operation input. The communication unit 107 transmits the predetermined operation command C to the television 10 based on the command information.

The control unit 103 reads the icon data stored in the memory 105 to generate display data of the GUI screen, and supplies the display data to the display panel 101a. The display panel 101a displays the GUI screen based on the display data. The control unit 103 generates the display data of the GUI screen such that the shapes and arrangement of the icons are changed according to the operation state of the remote controller 100 as described later.

The control unit 103 generates a message Msg designating the predetermined moving direction Dd at a predetermined point of time and notifies it to the user as described later. The message Msg may be visually notified by use of the display panel 101a, and may be aurally notified by use of a speaker (not shown).

The moving direction Dd is designated as any of the upper direction, the lower direction, the left direction and the right direction relative to the touch panel 101b, for example. The moving direction Dd is designated as a moving direction relative to the touch panel 101b. In this case, for example, the message Msg indicating "move finger straight upward along display screen" is notified.

The moving direction Dd may be designated as two or more points by which the moving direction relative to the touch panel 101b can be specified. In this case, for example, the message Msg of "designate a point with finger at lower end of display screen and then designate a point just above the point with finger at upper end of display screen" is notified.

The control unit 103 determines the operation state of the remote controller 100 based on the difference Δ between the designated moving direction Dd and the moving direction Da of the finger P moving on the touch panel 101b according to the designation. Then, the control unit 103 determines the operation state of the remote controller 100 based on the difference Δ between the designated moving direction Dd and the detected moving direction Da.

When the moving direction is designated, the moving direction Da of the finger P is found based on a moving trajectory of the finger P continuously detected on the touch panel 101b in response to the drag operation or flick operation. The drag operation is to move the finger P while the finger P is in contact with the touch panel 101b, and the flick operation is to flick the touch panel 101b with the finger P in an arbitrary direction. In this case, the moving direction Da of the finger P is found based on a coordinate difference between coordinate data (moving start point) when the contact signal is detected and coordinate data (moving end point) immediately before the release signal is detected.

On the other hand, when the points by which the moving direction can be specified are designated, the moving direction Da of the finger P is found based on moving coordinates of the finger P discretely detected between one point and the other point on the touch panel 101b in response to a pointing operation. The pointing operation is to indicate an arbitrary point on the touch panel 101b with the finger P. In this case, the moving direction Da of the finger P is found based on a coordinate difference between coordinate data (moving start point) when the pointing on one point is detected and coordinate data (moving end point) when the pointing on the other point is detected.

3. Operations of Remote Controller 100

Figure 3:
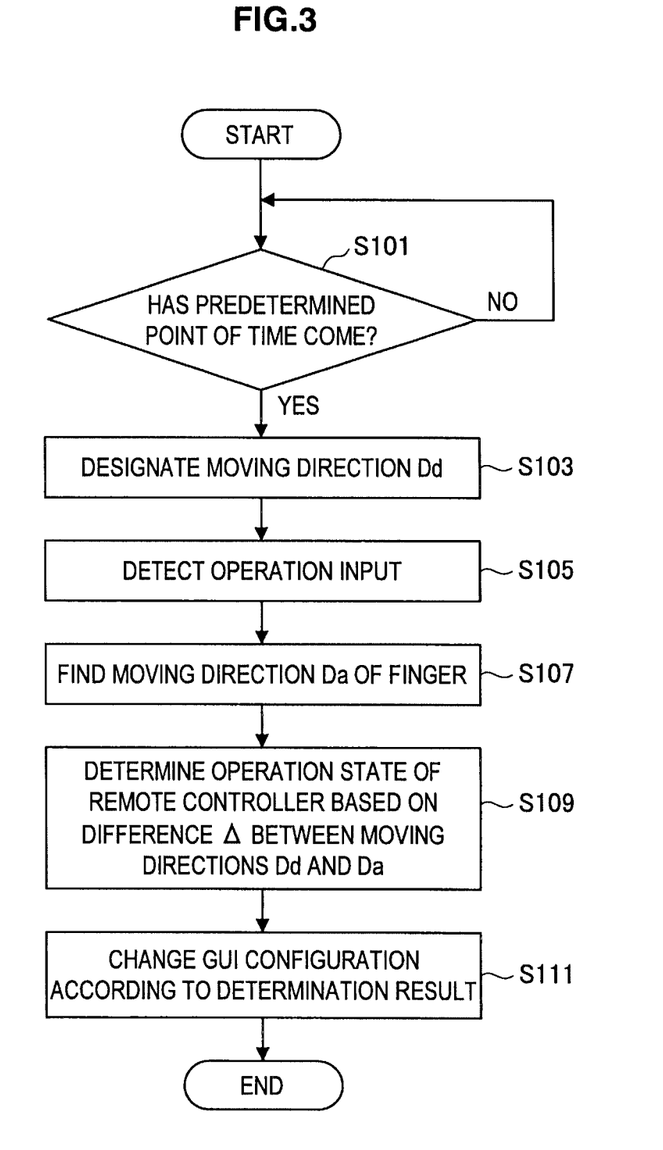
FIG. 3 is a flow diagram showing the operations of the remote controller.
Figure 4:
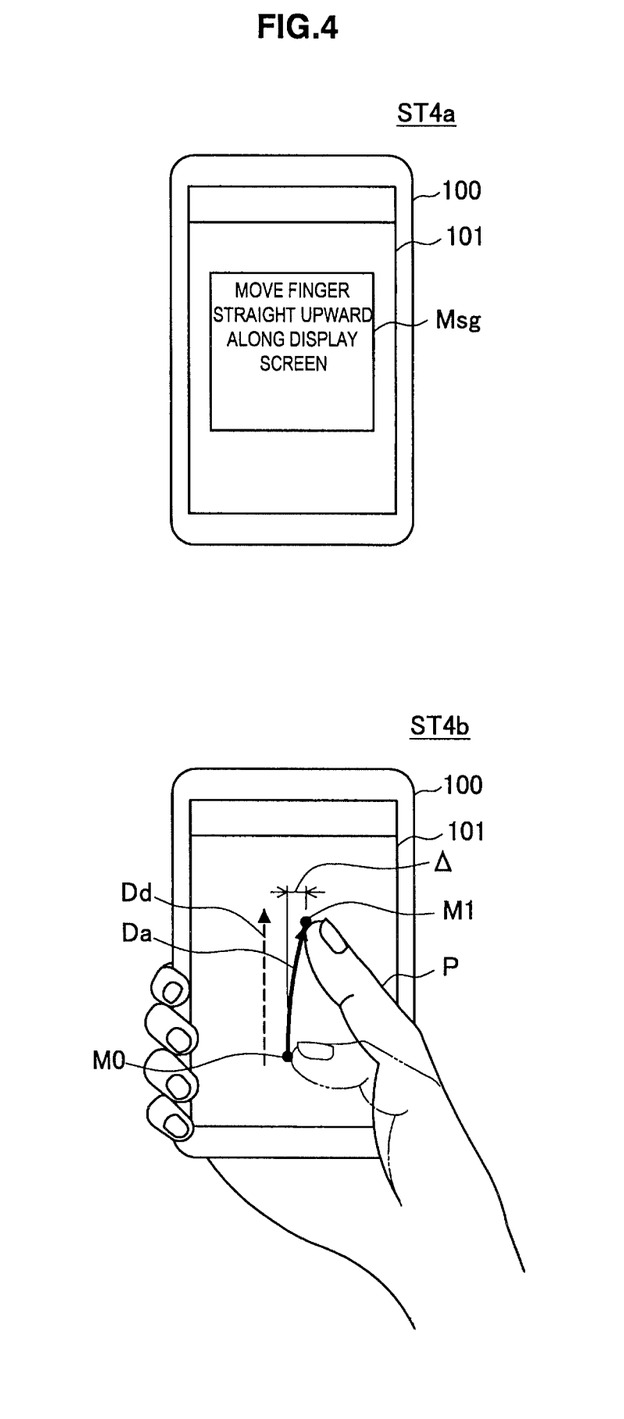
FIG. 4 is a diagram for explaining the operations of the remote controller.
Figure 5:
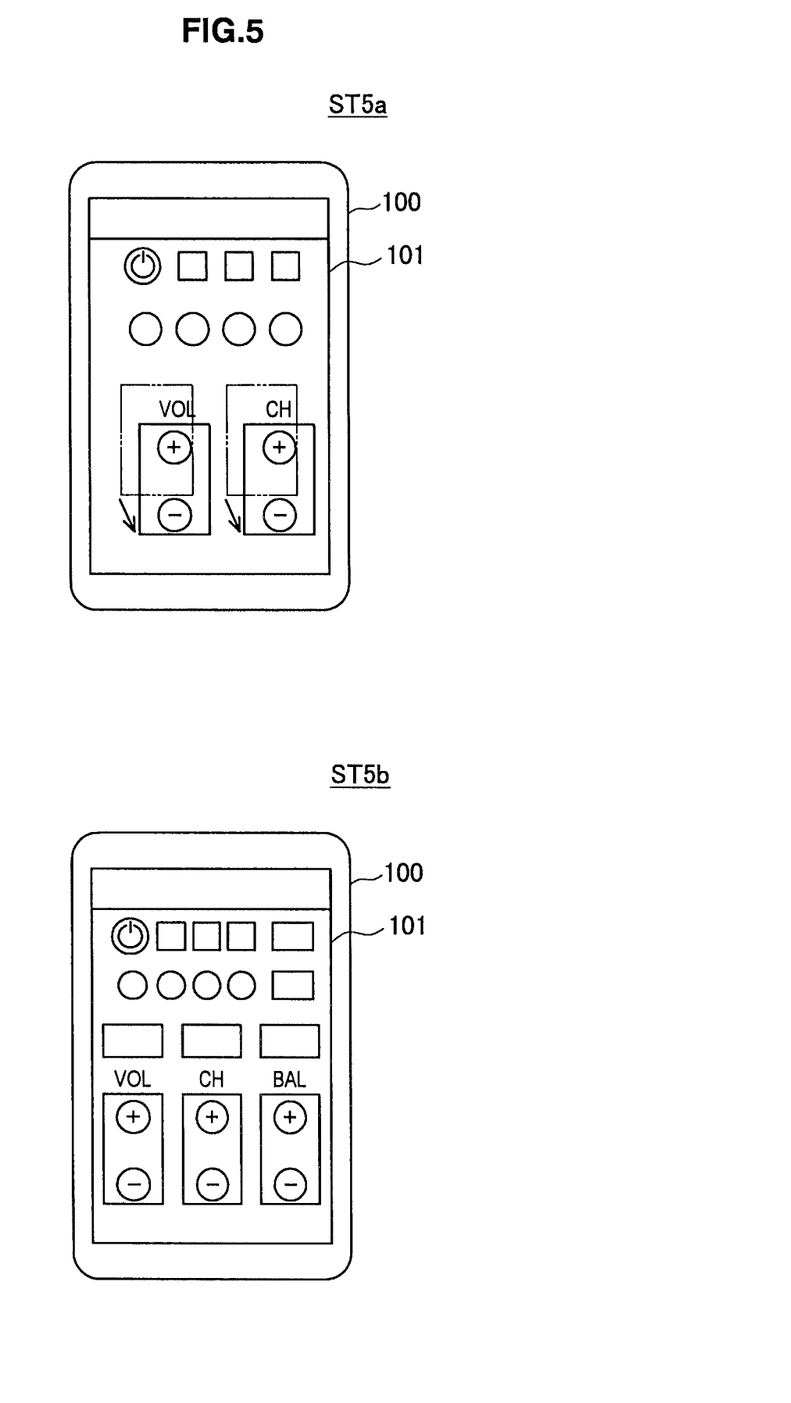
FIG. 5 is a diagram showing a modified example of a GUI configuration according to an operation state.

The operations of the remote controller 100 will be described below with reference to FIGS. 3 to 5. FIG. 3 is a flow diagram showing the operations of the remote controller 100. FIG. 4 is a diagram for explaining the operations of the remote controller 100. FIG. 5 is a diagram showing a change in the GUI configuration according to an operation state.

As shown in FIG. 3, the control unit 103 starts a processing of determining an operation state when a predetermined point of time comes (step S101). The predetermined point of time may be when a predetermined operation is input, or may be when a predetermined processing is performed such as when the remote controller 100 is activated.

When starting the determination processing, the control unit 103 notifies the message Msg designating the predetermined moving direction Dd to the user (S103). For example, in FIG. 4, the message Msg of "move finger straight upward along display screen" is displayed (state ST4a).

When the message Msg is displayed and an operation is input in response to the message Msg, the remote controller 100 detects the operation input (S105). For example, in FIG. 4, the user tries to move the thumb P of the right hand straight upward on the touch panel 101b (the touch panel display 101), but the finger P slightly tilts in the upper right direction due to the structure of the right hand (state ST4b).

When the operation input is detected, the control unit 103 finds the moving direction Da of the finger P based on the coordinate difference between the moving start point M0 and the moving end point M1 of the finger P (S107). After finding the moving direction Da, the control unit 103 determines the operation state of the remote controller 100 based on the difference Δ between the designated moving direction Dd and the detected moving direction Da (S109). The operation state is discriminated between the operation with one hand and the operation with both hands, and between the operation with the left hand and the operation with the right hand. When the operation state can be determined, the control unit 103 changes the GUI configuration according to the determination result (S111).

FIG. 5 shows a modified example of the GUI configuration according to the operation state. The state ST5a is a modified example of the operation with the right hand and the state ST5b is a modified example of the operation with both hands.

At the time of the operation with the right hand, at least part of the icons is moved toward the lower right of the touch panel 101b in order to improve operability with the thumb P of the right hand (state ST5a). In FIG. 5, a channel switch button and a sound volume button are moved. The icon to be moved may be a frequently-operated icon. At least part of the icons may be enlarged in size than on the operation with both hands in order to improve operability on the operation with either hand.

On the other hand, more icons are displayed on the touch panel 101b on the operation with both hands than on the operation with either hand in order to improve operability on the operation with both hands (step ST5b). In FIG. 5, more icons are displayed than in the state ST5a. At least part of icons may be downsized than on the operation with either hand.

4. Operation State Determination Processing

Figure 6:
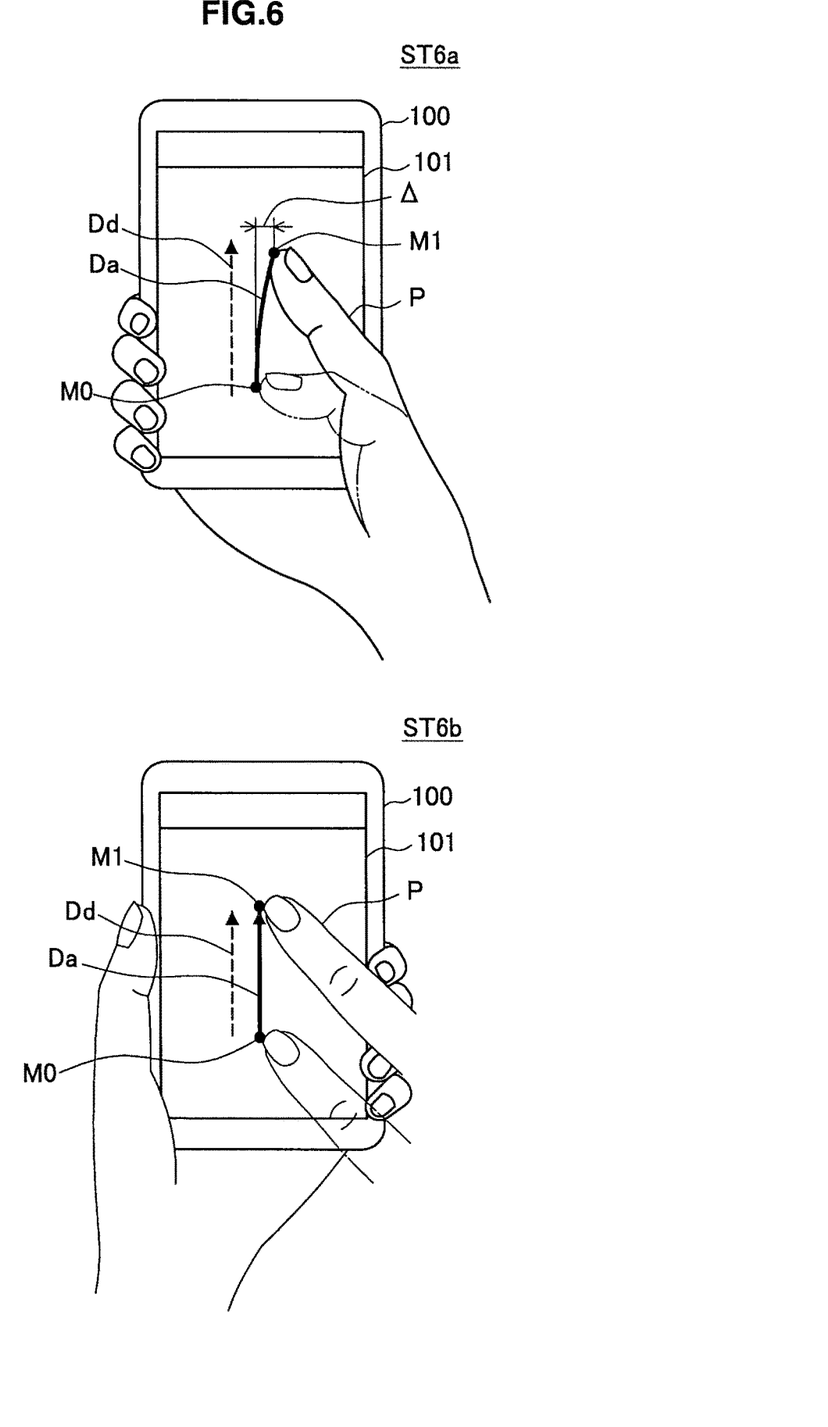
FIG. 6 is a diagram showing a finger's moving state according to an operation state.

The operation state determination processing will be described below with reference to FIGS. 6 to 8. FIG. 6 is a diagram showing a moving state of the finger P according to an operation state. FIGS. 7A to 7C are diagrams showing the moving directions Da of the finger P detected on the operation with the right hand, on the operation with the left hand and on the operation with both hands, respectively. FIG. 8 is a flow diagram showing an exemplary operation state determination processing.

As shown in state ST6a of FIG. 6, on the operation with the right hand, the remote controller 100 is held with the right hand and the root of the thumb P of the right hand is positioned at the lower right of the remote controller 100. When the thumb P is moved on the touch panel 101b, the thumb P operates with its root as a center. Thus, even when the user moves the thumb P for a straight direction, the thumb P easily moves to draw a circle with the root of the thumb P as a center. The moving state on the operation with the left hand can be similarly explained as the moving state on the operation with the right hand.

On the other hand, as shown in state ST6b of FIG. 6, on the operation with both hands, the remote controller 100 is held with one hand (such as left hand) and the index finger P or the like of the other hand (such as right hand) moves on the touch panel 101b (touch panel display 101). The finger P of the other hand can be freely moved on the touch panel 101b irrespective of the left hand holding the remote controller 100. When the user moves the index finger P for a straight direction, the index finger P easily moves to draw a circle. The coordinate difference ΔX in the X direction between the start point M0 and the end point M1 of the moving operation is not shown in FIG. 6, but a slight coordinate difference ΔX typically occurs.

Figure 7A:
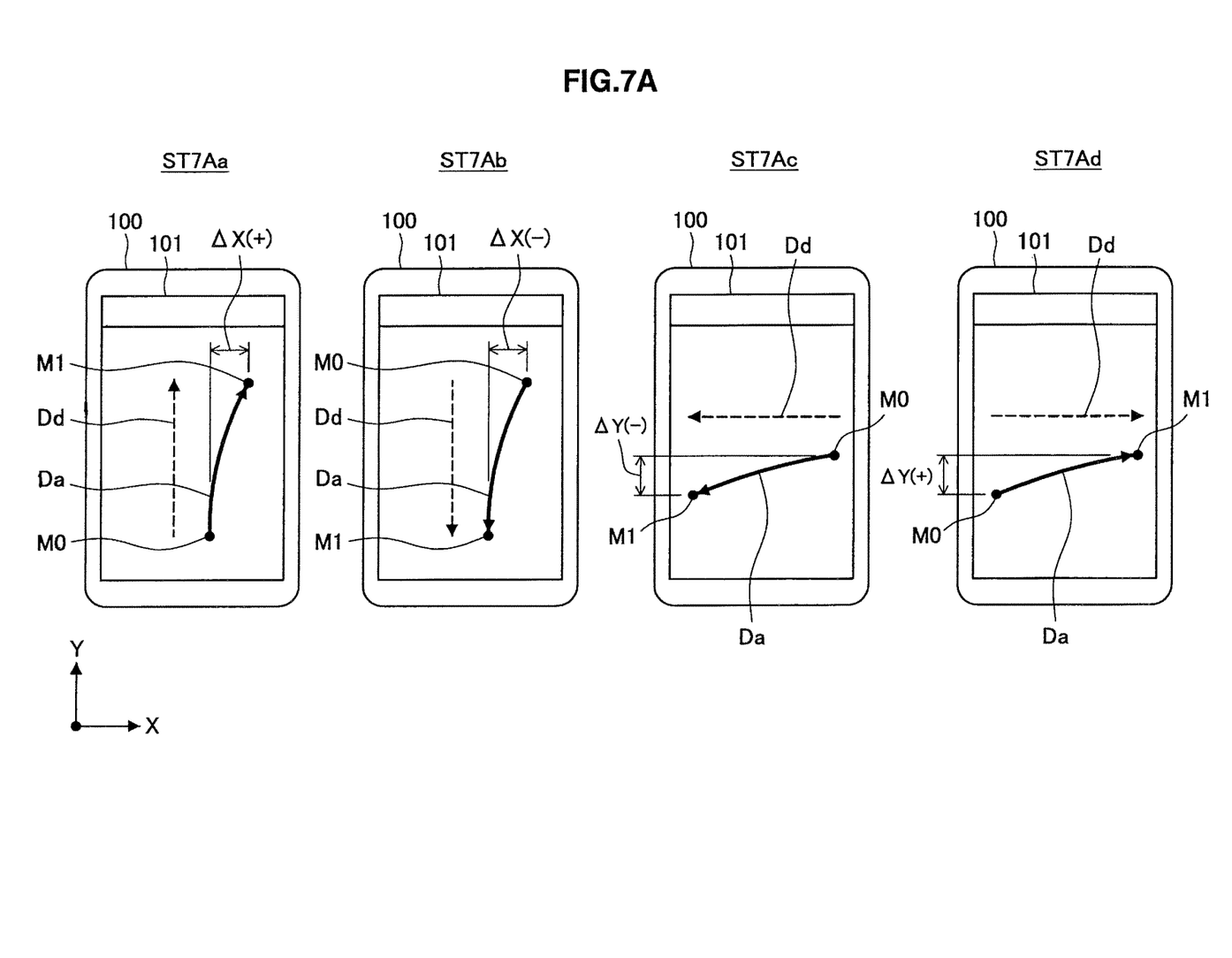
FIG. 7A is a diagram showing a finger's moving direction detected on the right hand's operation.
Figure 8:
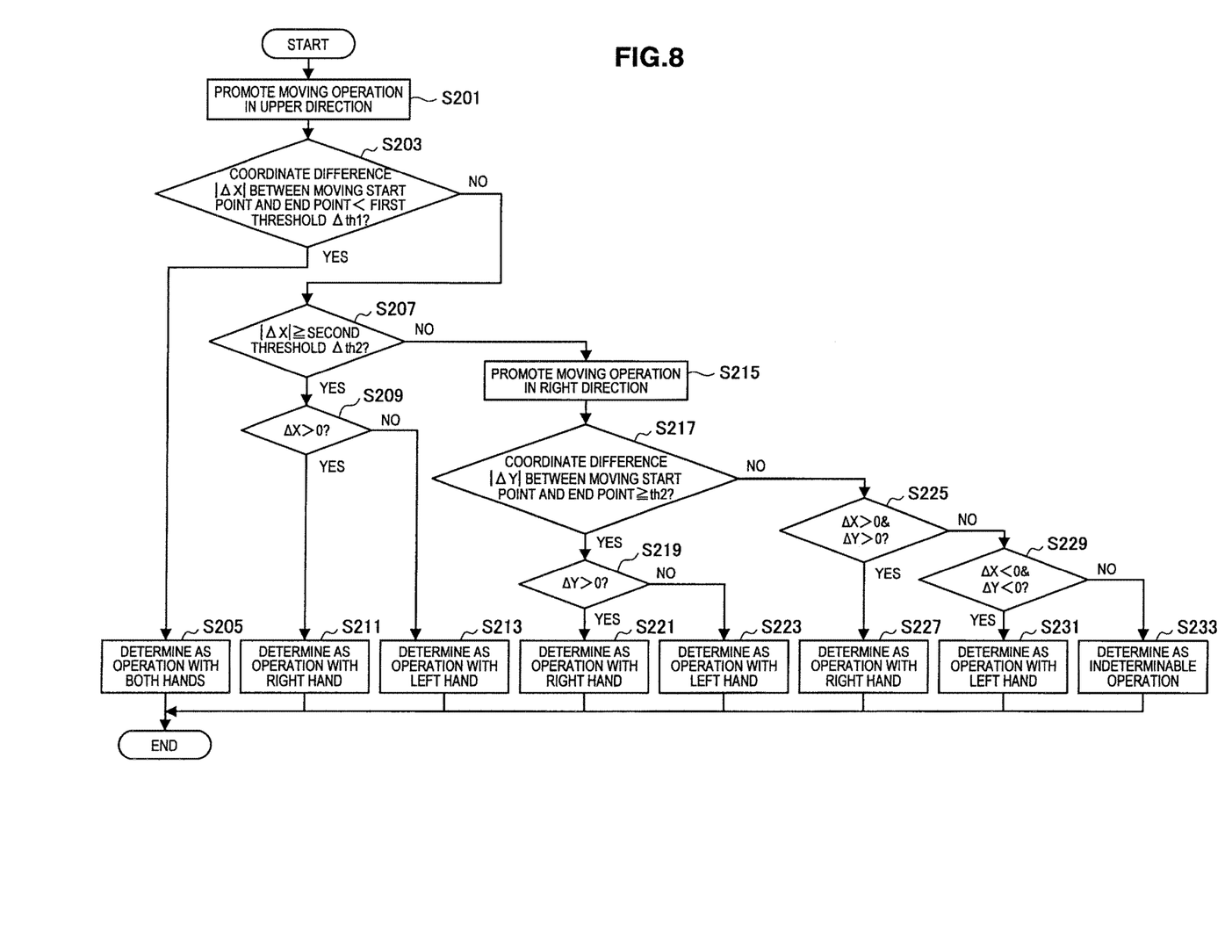
FIG. 8 is a flow diagram showing an exemplary operation state determination processing.

FIG. 7A shows the moving direction Da of the finger P detected on the operation with the right hand. In this case, when the moving operation in the upper direction is designated, the moving direction Da tilts in the right direction (state ST7Aa), and when the moving operation in the lower direction is designated, the moving direction Da easily tilts in the left direction (state ST7Ab). When the moving operation in the left direction is designated, the moving direction Da tilts in the lower direction (state ST7Ac), and when the moving operation in the right direction is designated, the moving direction Da easily tilts in the upper direction (state ST7Ad).

Figure 7B:
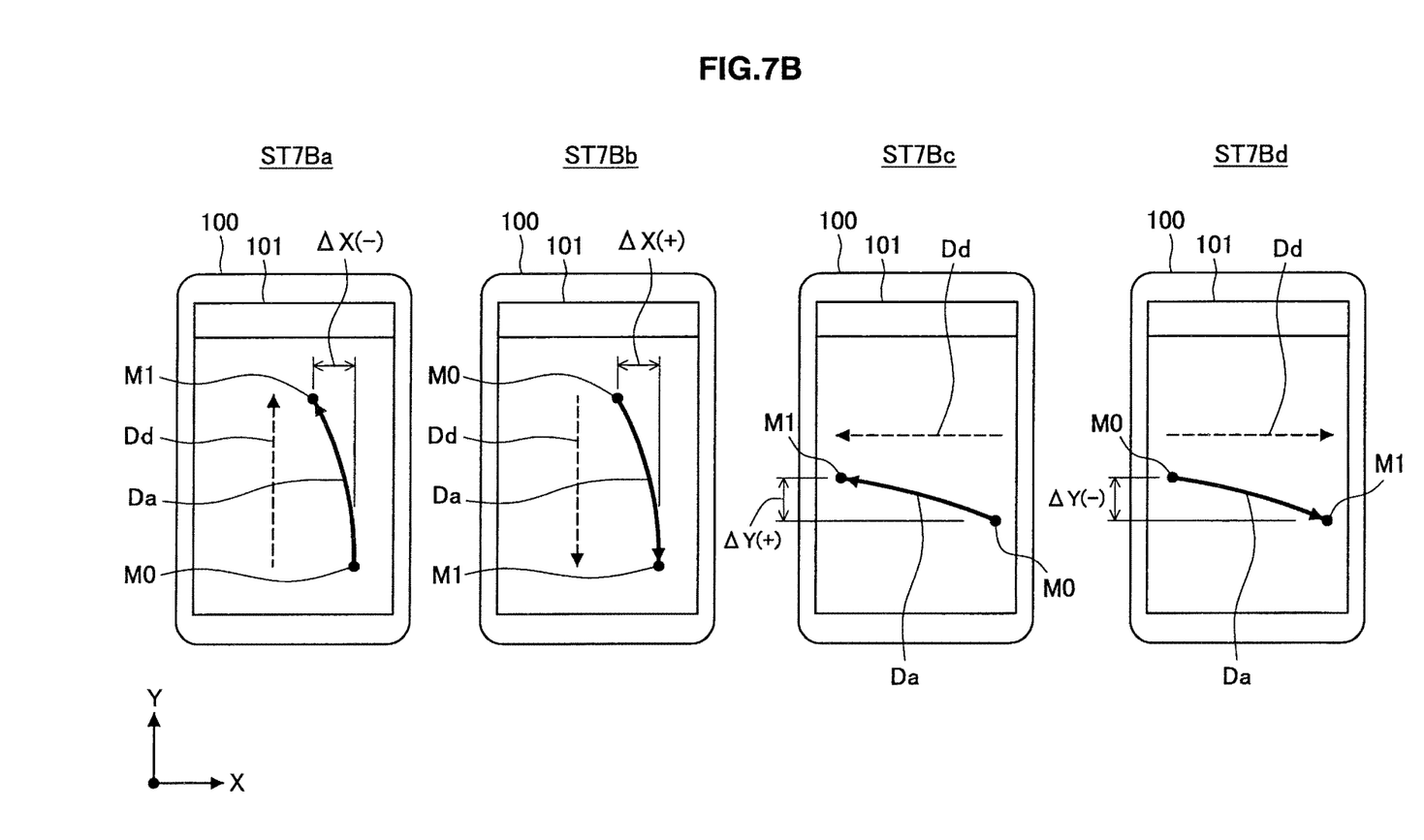
FIG. 7B is a diagram showing a finger's moving direction detected on the left hand's operation.

FIG. 7B shows the moving direction Da of the finger P detected on the operation with the left hand. In this case, when the moving operation in the upper direction is designated, the moving direction Da tilts in the left direction (state ST7Ba), and when the moving operation in the lower direction is designated, the moving direction Da easily tilts in the right direction (state ST7Bb). When the moving operation in the left direction is designated, the moving direction Da tilts in the upper direction (state ST7Bc), and when the moving operation in the right direction is designated, the moving direction Da easily tilts in the lower direction (state ST7Bd).

Figure 7C:
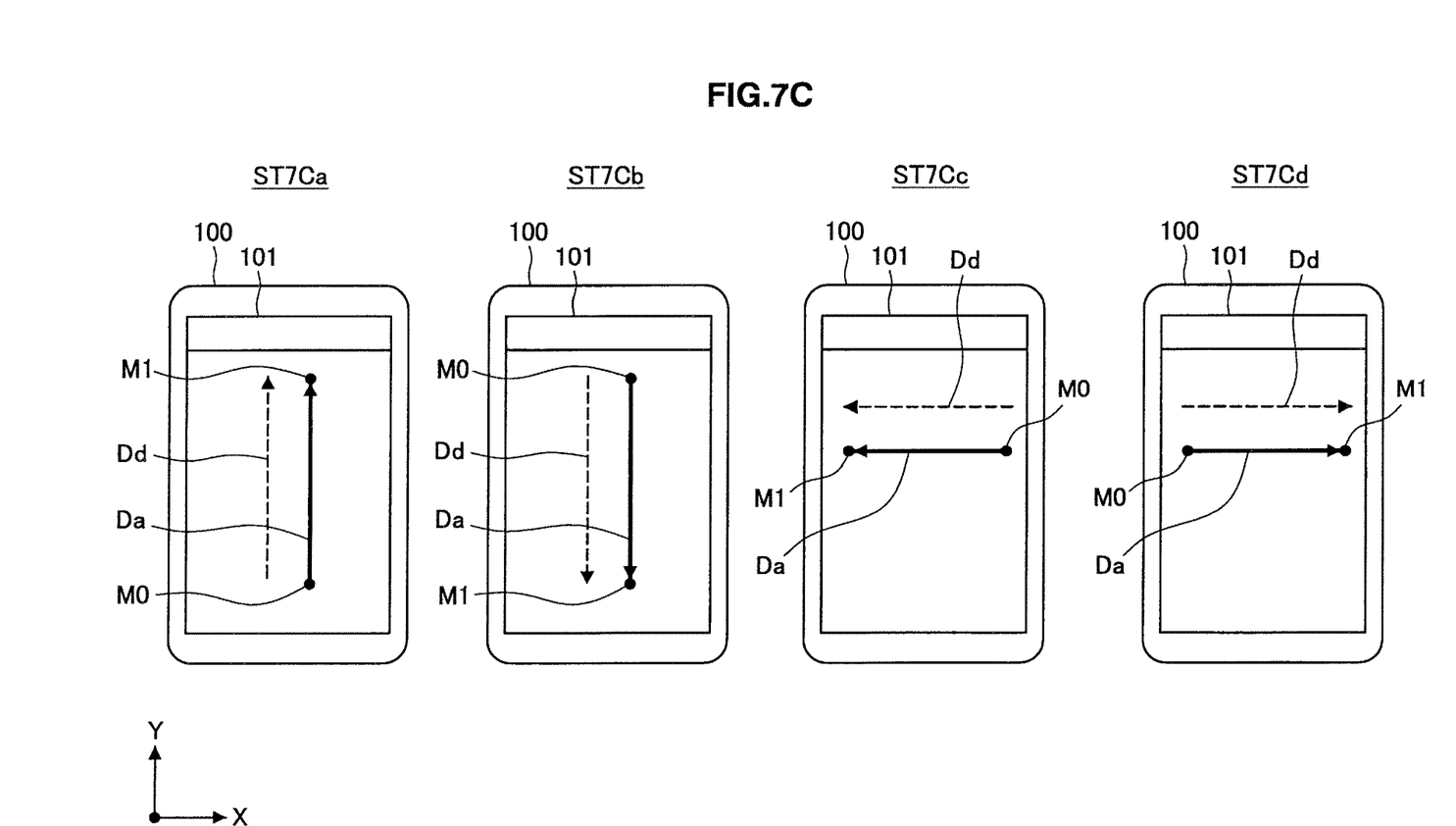
FIG. 7C is a diagram showing a finger's moving direction detected on the both-hand operation.

FIG. 7C shows the moving direction Da of the finger P detected on the operation with both hands. In this case, even when the moving direction Dd in any of the upper, lower, left and right directions is designated, the finger typically moves in the designated direction, and thus the moving direction Da is less likely to tilt in a specific direction (states ST7Ca to ST7Cd).

FIG. 8 shows an exemplary operation state determination processing. In the determination processing shown in FIG. 8, the control unit 103 first promotes the user to perform the moving operation in the upper direction on the touch panel 101b (step S201).

The control unit 103 determines whether the absolute value |ΔX| of the coordinate difference ΔX (the end point coordinate−the start point coordinate) in the X direction between the start point M0 and the end point M1 of the moving operation in the upper direction is less than a first threshold Δth1 (S203). Then, if the determination condition is met, the control unit 103 determines that the operation is with both hands (S205).

If the determination condition in step S203 is not met, the control unit 103 determines whether the absolute value |ΔX| is a second threshold Δth2 the first threshold Δth1) or more (S207). The threshold Δth2 is used to determine the absolute value |ΔX|, thereby preventing the operation state from being erroneously determined.

When the determination condition is met, the control unit 103 determines whether the coordinate difference ΔX is a positive value (S209). The control unit 103 determines that the operation is with the right hand when the coordinate difference ΔX is a positive value (S211), and determines that the operation is with the left hand when the coordinate value ΔX is a negative value (S213).

On the other hand, in the processing in step S207, when it is determined that the absolute value |ΔX| is less than the threshold Δth2, the control unit 103 promotes the user to perform the moving operation in the right direction on the touch panel 101b (S215).

The control unit 103 determines whether the absolute value |ΔY| of a coordinate difference ΔY (the end point coordinate−the start point coordinate) in the Y direction between the start point coordinate M0 and the end point coordinate M1 of the moving operation in the right direction is the second threshold Δth2 or more (S217). The threshold Δth2 is used to determine the absolute value |ΔY|, thereby preventing the operation state from being erroneously determined.

If the determination condition is met, the control unit 103 determines whether the coordinate difference ΔY is a positive value (S219). The control unit 103 determines that the operation is with the right hand when the coordinate difference ΔY is a positive value (S221), and determines that the operation is with the left hand when the coordinate value ΔY is a negative value (S223).

On the other hand, in the processing in step S217, when it is determined that the absolute value |ΔY| is less than the threshold Δth2, the control unit 103 determines the operation state in a combination of the determination results on the moving operations in the upper direction and in the right direction. Thereby, even when the absolute values |ΔX| and

|ΔY| are small, the determination results on the moving operations in mutually different directions can be used to determine the operation state.

The control unit 103 determines whether both of the coordinate differences |ΔX| and |ΔY| in the X direction and in the Y direction are positive (S225). Then, the control unit 103 determines that the operation is with the right hand when the determination condition is met (S227).

On the other hand, if the determination condition is not met, the control unit 103 determines whether both of the coordinate differences ΔX and ΔY in the X direction and in the Y direction are negative (S229). The control unit 103 determines that the operation is with the left hand when the determination condition is met (S231), and determines that the operation is indeterminable when the determination condition is not met (S233).

In the above example, the first threshold Δth1 is used to determine the operation with both hands in the processing in step S203. However, when the determination condition in step S229 is not met, it may be determined that the operation is with both hands, instead of determining that the operation is indeterminable. A determination is made as to whether the absolute value |ΔY| of the coordinate difference ΔY in the Y direction on the moving operation in the right direction is less than the threshold Δth1 after step S215, and when the determination condition is met, it may be determined that the operation is with both hands.

In the above example, the determination results on the moving operations in the upper direction and in the right direction are used to determine the operation state. However, with the moving operations in mutually different directions, the determination results of the moving operations in any directions may be used, such as in the upper direction and the lower direction, in the upper direction and the left direction, or in the left direction and the right direction. When the determination results of the moving operations in mutually orthogonal directions are used, the difference Δ between the moving directions Dd and Da easily occurs due to an aspect ratio of the touch panel 101b, thereby determining the operation state with a high accuracy.

In the above example, the operation state is determined in a combination of the determination results on the moving operations in the upper direction and the right direction in the processings in and subsequent to step S225, but when the determination condition is not met in the processing in step S217, the moving operation may be determined as indeterminable.

In the above example, the same threshold Δth2 is used as the threshold on the moving operation in the upper direction and as the threshold on the moving operation in the right direction, but different thresholds such as Δth2 and Δth2' may be used.

5. Conclusion

As described above, with the remote controller 100 according to one embodiment of the present invention, the operation state of the remote controller 100 is determined based on the difference Δ between the designated moving direction Dd and the moving direction Da of the finger P moving on the display panel 101a according to the designation. When the remote controller 100 is operated with either hand, the difference Δ depending on the finger P used for the operation easily occurs between the designated moving direction Dd and the moving direction Da of the finger P due to the structure of the hand. On the other hand, when the remote controller 100 is operated with both hands, the difference Δ depending on the fingers P used for the operation is difficult to occur between the designated moving direction Dd and the moving direction Da of the finger P. Thus, the operation state of the remote controller 100 can be easily and accurately determined based on the difference Δ between the moving directions Dd and Da.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

For example, the explanation has been made in the above embodiment assuming that the upper, lower, left and right moving directions Dd are designated for the touch panel 101b. However, for example, oblique moving directions Dd may be designated along the diagonals of the touch panel 101b. In this case, the operation state of the remote controller 100 can be determined based on the difference Δ (difference in angle) between the designated moving direction Dd along a diagonal and the detected moving direction Da.

The explanation has been made in the above embodiment assuming that the moving direction Da of a finger P in contact with the touch panel 101b is detected. However, the moving direction Da of a finger approaching the touch panel 101 may be detected.

REFERENCE SIGNS LIST

100 Remote controller
101 Touch panel display
101a Display panel
101b Touch panel
103 Control unit
105 Memory
107 Communication unit

The invention claimed is:

1. An information processing apparatus comprising: circuitry configured to:
provide a visual indication of a designated moving direction on a display panel;
detect a movement on the display panel in response to the visual indication of the designated moving direction;
determine whether a first operation state or a second operation state of the information processing apparatus exists based on an amount of difference, in a plane of the display panel and in a direction orthogonal to the designated moving direction, between a moving start point and a moving end point of the detected movement on the display panel, wherein the amount of difference is a distance, in the plane of the display panel and in the direction orthogonal to the designated moving direction, between the moving start point and the moving end point of the detected movement on the display panel; and
cause a configuration of a display of operation icons on the display panel to be (i) a first configuration when the first operation state is determined to exist and (ii) a second configuration when the second operation state is determined to exist,
wherein the second configuration has more operation icons displayed on the display panel than the first configuration, such that when the second operation state is determined to exist, more of the operation icons are displayed on the display panel than when the first operation state is determined to exist.

2. The information processing apparatus according to claim 1, wherein the circuitry is configured to determine whether a left hand of a user holds and operates the information processing apparatus, or a right hand of the user holds and operates the information processing apparatus.

3. The information processing apparatus according to claim 1, wherein the designated moving direction is designated as any of an upper direction, a lower direction, a left direction and a right direction relative to the display panel.

4. The information processing apparatus according to claim 3, wherein the circuitry is configured to designate two or more points that specify the designated moving direction on the display panel, and find the moving start point and the moving end point of the detected movement based on moving coordinates of the detected movement discretely detected between the moving start point and the moving end point on the display panel.

5. The information processing apparatus according to claim 1, wherein the information processing apparatus is a remote controller that operates an electronic device.

6. An information processing method for use by an information processing apparatus, the information processing method comprising:
   providing a visual indication of a designated moving direction on a display panel of the information processing apparatus;
   detecting, by circuitry of the information processing apparatus, a movement on the display panel in response to the visual indication of the designated moving direction;
   determining whether a first operation state or a second operation state of the information processing apparatus exists based on an amount of difference, in a plane of the display panel and in a direction orthogonal to the designated moving direction, between a moving start point a moving end point of the detected movement on the display panel, wherein the amount of difference is a distance, in the plane of the display panel and in the direction orthogonal to the designated moving direction, between the moving start point and the moving end point of the detected movement on the display panel; and
   causing a configuration of a display of operation icons on the display panel to be (i) a first configuration when the first operation state is determined to exist and (ii) a second configuration when the second operation state is determined to exist,
   wherein the second configuration has more operation icons displayed on the display panel than the first configuration, such that when the second operation state is determined to exist more of the operation icons are displayed on the display panel than when the first operation state is determined to exist.

7. A non-transitory computer-readable medium having stored thereon a set of computer-readable instructions for causing a computer to execute an information processing method in an information processing apparatus, the information processing method comprising:
   providing a visual indication of a designated moving direction on a display panel of the information processing apparatus;
   detecting a movement on the display panel in response to the visual indication of the designated moving direction;
   determining whether a first operation state or a second operation state of the information processing apparatus exists based on an amount of difference, in a plane of the display panel and in a direction orthogonal to the designated moving direction, between a moving start point and a moving end point of the detected movement on the display panel, wherein the amount of difference is a distance, in the plane of the display panel and in the direction orthogonal to the designated moving direction, between the moving start point and the moving end point of the detected movement on the display panel; and
   causing a configuration of a display of operation icons on the display panel to be (i) a first configuration when the first operation state is determined to exist and (ii) a second configuration when the second operation state is determined to exist,
   wherein the second configuration has more operation icons displayed on the display panel than the first configuration, such that when the second operation state is determined to exist more of the operation icons are displayed on the display panel than when the first operation state is determined to exist.

8. The information processing apparatus according to claim 1, wherein the circuitry is configured to compare an absolute value of a coordinate difference of the moving start point and the moving end point of the detected movement with a predetermined threshold value to determine whether the information processing apparatus is in the first operation state or in the second operation state.

9. The information processing apparatus of claim 1, wherein
   in the first operation state, one hand of a user holds the information processing apparatus and performs the movement on the display panel of the information processing apparatus, and
   in the second operation state, the one hand of the user holds the information processing apparatus and another hand of the user performs the movement on the display panel of the information processing apparatus.

* * * * *